Figure 1:
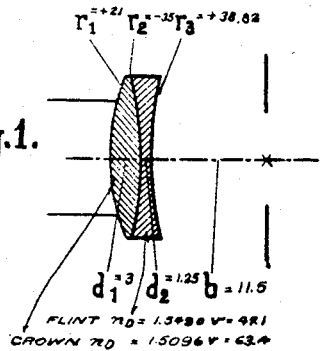

Sept. 27, 1927.

F. WEIDERT 1,643,865

PHOTOGRAPHIC TWO-LENS OBJECTIVE

Filed Aug. 5, 1924

Inventor:
Franz Weidert

Patented Sept. 27, 1927.

1,643,865

UNITED STATES PATENT OFFICE.

FRANZ WEIDERT, OF BERLIN-ZEHLENDORF, GERMANY, ASSIGNOR TO OPTISCHE ANSTALT C. P. GOERZ AKTIENGESELLSCHAFT, OF BERLIN-FRIEDENAU, GERMANY, A FIRM.

PHOTOGRAPHIC TWO-LENS OBJECTIVE.

Application filed August 5, 1924, Serial No. 730,148, and in Germany August 13, 1923.

An objective known as "French landscape lens", that is to say a two-lens cemented achromatic objective with front diaphragm was fitted until quite recently to inexpensive photographic cameras. This objective answers various requirements as regards the quality of the image, but important practical disadvantages of the camera arrangement are that the shutter is liable to be easily damaged, that the camera is unnecessarily long owing to an important component of the camera (viz. diaphragm and shutter) being disposed in front of the lens, and finally that the appearance of the camera is affected thereby.

The present invention provides a two-lens objective which is as inexpensive as the landscape lens with front diaphragm referred to and which forms images of high quality, albeit that the aperture ratio is small, but yet much larger than hitherto. This objective is moreover free from the above-mentioned risk of damage to the shutter and from the disadvantage of undue length and unsightly appearance.

The lens according to the present invention has a number of features which are as follows:

First, a rear diaphragm is used the distance of which from the apex of the lens nearer the image is at least 8% of the focal length of the objective.

Second, the objective is spherically undercorrected on the axis in order to reduce coma defects as much as possible. The undercorrection must be at least 2% of the focal length of the objective for a ray having an incidence parallel to the axis of 1/18 the focal length of the objective. Third, the refractive power of the cemented surface is of a comparatively low dispersive nature or it may even be slightly collective in order that its curvature should be as small as possible, so that the product of the curvature of the cemented surface that is to say the reciprocal value of its radius expressed in meters and its refractive power, that is to say, the sum of the refractive powers of the two lens surfaces contacting with each other, the refractive power of each of said surfaces being equal to the reciprocal value in meters of the focal length of a lens section with said surface, the second surface of which being plane is always smaller than 60 when the focal length of the objective under consideration is reduced to 100 millimetres. Finally, in order to give the cemented surface a small curvature while using cheap glass, and in order to have a wider choice of meltings, the difference between the $v$ values, that is the reciprocal values of the dispersive power of the two kinds of glass is considerable. In any case the difference should never be below 10 units.

Results similar to those yielded by a two-lens cemented objective may also be obtained by replacing the cemented surface by a thin air lens or space the axial thickness of which is not more than 3% of the focal length of the objective. In this case the front lens or component may not only have a smaller refractive index than the rear lens or component, but also a larger one. This is an advantage over the cemented objective for which practically only one type of front lens comes under consideration, the refractive index of the said lens being smaller than that of the rear lens. In objectives with central air lens or space, the above-mentioned product of curvature and refractive power of the cemented surface is the product of the curvature of the front surface of the air lens or space and of the sum of the refractive powers of the lens surfaces forming the air lens. This product lies between —20 and +60 in this construction of the objective.

Figure 2:
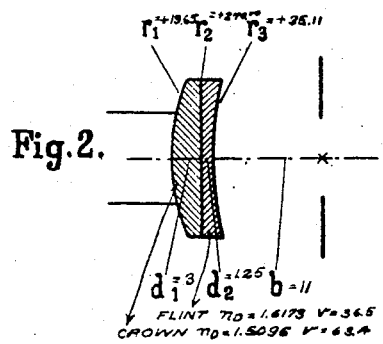

Three constructions of the objective according to the present invention are illustrated in the accompanying drawing. In Figures 1 and 2 the objective is composed of two cemented components and in Figure 3 of two components separated by a thin air space. Details of these constructions are given hereunder with reference to the figures. The various kinds of glasses are quoted from the catalogue of the Sendlinger Optische Glaswerke G. m. b. H. of Berlin-Zehlendorf. All measurements in the examples are in millimetres.

EXAMPLE 1 (Figure 1).

$f_D = 100$ mm.

Effective aperture $f/9$.

$r_1 = +21$
$r_2 = -35$
$r_3 = +38,82$
$d_1 = 3$ crown 510/634
$d_2 = 1,25$ flint 549/471

Stop distance $b=11,5$.
Diameter of diaphragm $=9,1$.
Free diameter of lens $=14,7$.

*Optical properties of the glasses.*

Crown 510/634: $n_D=1,5096$;
$n_F=1,5153$; $n_{G'}=1,5197$; $v=63,4$
Flint 549/471: $n_D=1,5490$;
$n_F=1,5573$; $n_{G'}=1,5641$; $v=47,1$
Spherical undercorrection for 5,56 mm. incidence $=3,1$ mm.
Curvature of the cemented surface $=-28,57$.
Refractive power of the rear surface of the front lens $+14,56$.
Refractive power of the front surface of the rear lens $-15,69$.
Sum of refractive powers of contacting lens surfaces $-1,13$.
Product of these two values $+32,28$.

EXAMPLE 2 (Figure 2).

$f_D=100$ mm.

Effective aperture $f/11$.

$\left.\begin{array}{l} r_1=+\ 19,65 \\ r_2=+270,00 \\ r_3=+\ 35,11 \end{array}\right\} \begin{array}{l} d_1=3 \quad \text{crown 510/634} \\ d_2=1,25\ \text{flint 617/365} \end{array}$ Stop distance $b=11$.
Diameter of diaphragm $=7,5$.
Free diameter of lens $=15$.

*Optical properties of the glasses.*

Crown 510/634: $n_D=1,5096$;
$n_F=1,5153$; $n_{G'}=1,5197$; $v=63,4$
Flint 617/365: $n_D=1,6173$;
$n_F=1,6294$; $n_{G'}=1,6397$; $v=36,5$
Spherical undercorrection for 5,56 mm. incidence $=4,5$ mm.
Curvature of the cemented surface $=+3,70$ diopters.
Refractive power of the rear surface of the front lens $-1,89$ diopters.
Refractive power of the front surface of the rear lens $+2,29$ diopters.
Sum of refractive powers of contacting lens surfaces $+0,40$ diopters.
Product of these two values $+1,48$.

Figure 3:
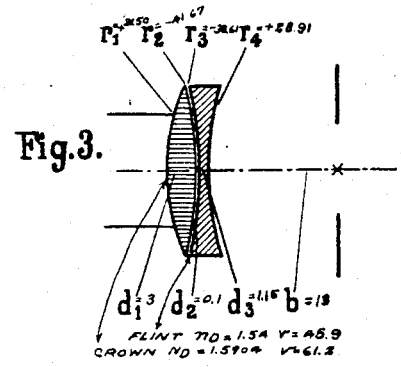

EXAMPLE 3 (Figure 3).

$f_D=100$ mm.

Effective aperture $f/9$.

$\left.\begin{array}{l} r_1=+21,50 \\ r_2=-41,67 \\ r_3=-38,61 \\ r_4=+28,92 \end{array}\right\} \begin{array}{l} d_1=3 \quad \text{barium 590/612} \\ d_2=0,1 \quad \text{air} \\ d_3=1,15\ \text{flint 548/459} \end{array}$ Stop distance $b=13$.
Diameter of diaphragm $=8,8$.
Free diameter of lens $=15,4$.

*Optical properties of the glasses.*

Barium 590/612: $n_D=1,5904$;
$n_F=1,5972$; $n_{G'}=1,6026$; $v=61,2$
Flint 548/459: $n_D=1,5479$;
$n_F=1,5564$; $n_{G'}=1,5634$; $v=45,9$
Spherical undercorrection for 5,56 mm. incidence $=3$ mm.
Curvature of the front surface of the air lens $-24$ diopters.
Refractive power of the rear surface of the front lens $+14,17$ diopters.
Refractive power of the front surface of the rear lens $-14,19$ diopters.
Sum of the refractive powers of the two lens surfaces $-0,02$ diopters.
Product of the values of said sum and said lens curvature $+0,46$.

In the above schedules the reference letters $r_1$, $r_2$, $r_3$ designate the radii of curvature of the lens surfaces of the system; $d_1$, $d_2$, $d_3$ are the thicknesses of the lenses; the terms crown, flint, barium with the two numerals added thereto designate the kinds of glass in conformity with the designation in the catalogue of Sendlinger Optische Glaswerke G. m. b. H. of Berlin-Zehlendorf. $n_D$, $n_F$, $n_G$ designate the refraction power for D, F and G lines of the spectrum respectively. The reference letter $v$ designates the reciprocal value of the dispersive power of a kind of glass $$v = \frac{n_D - l}{n_F - n_C}$$

The terms "curvature" and "refractive power" of a lens surface as used in the following claims means, as above stated, the reciprocal value of the radius of curvature of said surface expressed in meters and the reciprocal value of the focal length expressed in meters of a lens section containing the surface in question, the second surface of which lens section being a plane surface.

What I claim is:—

1. A chromatically corrected photographic objective having coordinated thereto a diaphragm disposed at its rear side at a distance from the apex of the lens nearest the image of at least 8% of the focal length of the objective, the objective comprising two glass lenses of which the front one is a collective lens and which lenses are formed of such kinds of glass and with such curvatures of their inner surfaces that the difference of the $v$ values of the two lenses is at least 10 units and that the product of the curvature of the rear surface of the front lens and of the sum of the refractive powers of the said two inner lens surfaces is between $+60$ and $-20$ for the objective as reduced to 100 mm. focal length, the objective as a whole being spherically undercorrected to such degree that the undercorrection on the axis for a ray parallel to the axis at an incidence of 1/18 of the focal length is at least 2% of the focal length of the objective.

2. A chromatically corrected photographic objective having coordinated thereto a diaphragm disposed at its rear side at a distance from the apex of the lens nearest the image of at least 8% of the focal length of the objective, the objective comprising two glass lenses the distance of which from each other is at the highest 3% of the focal length of the objective, the front lens being a collective one and the lenses being formed of such kinds of glass and with such curvatures of their inner surfaces that the difference of the $\nu$ values of the two lenses is at least 10 units and that the product of the curvature of the rear surface of the front lens and of the sum of the refractive powers of the said two inner lens surfaces is between $+60$ and $-20$ for the objective as reduced to 100 mm. focal length, the objective as a whole being spherically undercorrected to such degree that the undercorrection on the axis for a ray parallel to the axis at an incidence of 1/18 of the focal length is at least 2% of the focal length of the objective.

3. A chromatically corrected photographic objective having coordinated thereto a diaphragm disposed at its rear side at a distance from the apex of the lens nearest the image of at least 8% of the focal length of the objective, the objective comprising two glass lenses which are cemented together and of which the front one is a collective one and which lenses are formed of such kinds of glass and with such curvature of their contacting surfaces that the difference of the $\nu$ values of the two lenses is at least 10 units and that the product of the curvature of the cemented surface and of its refractive power is below 60 for the objective as reduced to 100 mm. focal length, the objective as a whole being spherically undercorrected to such degree that the undercorrection on the axis for a ray parallel to the axis at an incidence of 1/18 of the focal length is at least 2% of the focal length of the objective.

In testimony whereof I have signed this specification.

Dr. FRANZ WEIDERT.